(12) United States Patent
Habdank et al.

(10) Patent No.: US 9,354,937 B2
(45) Date of Patent: May 31, 2016

(54) SYSTEM AND METHOD FOR ELECTRONIC WORK PREDICTION AND DYNAMICALLY ADJUSTING SERVER RESOURCES

(71) Applicant: Thomson Reuters Global Resources (TRGR), Baar (CH)

(72) Inventors: Jozef Habdank, Charlottenlund (DK); Tadeusz Habdank-Wojewodzki, Cracow (PL)

(73) Assignee: THOMSON REUTERS GLOBAL RESOURCES, Baar (CH)

( * ) Notice: Subject to any disclaimer, the term of this patent is extended or adjusted under 35 U.S.C. 154(b) by 0 days.

(21) Appl. No.: 14/335,771

(22) Filed: Jul. 18, 2014

(65) Prior Publication Data

US 2016/0019094 A1 Jan. 21, 2016

(51) Int. Cl.
*G06F 9/455* (2006.01)
*G06F 9/50* (2006.01)

(52) U.S. Cl.
CPC .............. *G06F 9/505* (2013.01); *G06F 9/5061* (2013.01); *G06F 9/5083* (2013.01); *G06F 2209/5019* (2013.01)

(58) Field of Classification Search
USPC .............................................. 718/1, 100–107
IPC ................................... G06F 9/505,9/54, 9/5061
See application file for complete search history.

(56) References Cited

U.S. PATENT DOCUMENTS

| | | | |
|---|---|---|---|
| 6,993,458 B1 | 1/2006 | Castelli et al. | |
| 7,058,949 B1 * | 6/2006 | Willen et al. | 718/104 |
| 7,095,841 B2 * | 8/2006 | Mullen | 379/265.1 |
| 7,140,022 B2 * | 11/2006 | Binns | 718/105 |
| 7,302,685 B2 * | 11/2007 | Binns | G06F 9/4887 370/415 |
| 7,765,554 B2 * | 7/2010 | Musoll | G06F 9/461 718/103 |
| 7,958,507 B2 * | 6/2011 | Santos | G06F 9/4887 718/100 |
| 8,108,844 B2 * | 1/2012 | Crutchfield | G06F 8/443 717/136 |
| 8,448,170 B2 * | 5/2013 | Wipfel | H04L 9/3213 718/1 |
| 8,468,538 B2 * | 6/2013 | Attarde | G06F 3/0613 709/233 |
| 8,499,301 B2 * | 7/2013 | Edwards | H04M 3/5237 718/104 |
| 8,549,521 B2 * | 10/2013 | Brokenshire | G06F 9/4843 709/226 |
| 8,966,493 B1 * | 2/2015 | Richards | G06F 9/4887 718/104 |
| 8,984,519 B2 * | 3/2015 | Cadambi | G06F 9/505 718/103 |
| 8,997,107 B2 * | 3/2015 | Jain | G06F 9/46 709/223 |
| 2012/0089726 A1 | 4/2012 | Doddavula | |
| 2013/0304903 A1 | 11/2013 | Mick et al. | |

OTHER PUBLICATIONS

Jayram et al, "Online Server Allocation in a Server Farm via Benefit Task Systems", ACM, pp. 540-549, 2001.*
Jin et al, "BAR: An Efficient Data Locality Driven Task Scheduling Algorithm for Cloud Computing", IEEE, pp. 295-304, 2011.*

(Continued)

*Primary Examiner* — Anil Khatri
(74) *Attorney, Agent, or Firm* — Faegre Baker Daniels LLP

(57) ABSTRACT

A computer-implemented system and method facilitate dynamically allocating server resources. The system and method include determining a current queue distribution, referencing historical information associated with execution of at least one task, and predicting, based on the current queue distribution and the historical information, a total number of tasks of various task types that are to be executed during the time period in the future. Based on this prediction, a resource manager determines a number of servers that should be instantiated for use during the time period in the future.

19 Claims, 4 Drawing Sheets

(56) References Cited

OTHER PUBLICATIONS

Burmester et al, "Making Mechatronic Agents Resourceaware in order to Enable Safe Dynamic Resource Allocation" ACM, pp. 175-183, 2004.*

Matsui et al, "Distributed Cooperative Optimization on Cluster Trees", IEEE, pp. 38-45, 2013.*

Buzen, "Computational Algorithms for Closed Queueing Networks with Exponential Servers", Communications of the ACM, vol. 16, No. 9, pp. 527-531, 1973.*

Keller et al, "Response Time-Optimized Distributed Cloud Resource Allocation ", ACM, pp. 47-52, 2014.*

Raz et al, "Fair Operation of MultiServer and MultiQueue Systems", ACM, pp. 382-383, 2005.*

Maguluri et al, "Scheduling Jobs With Unknown Duration in Clouds", IEEE/ACM Transactions on Networking, vol. 22, No. 6, pp. 1938-1951, 2014.*

International Search Report and the Written Opinion of the International Searching Authority. International Application No. PCT/IB2015/055200. International Filing Date: Jul. 9, 2015. 10 pages.

\* cited by examiner

SYSTEM AND METHOD FOR ELECTRONIC WORK PREDICTION AND DYNAMICALLY ADJUSTING SERVER RESOURCES

BACKGROUND

To aid in the allocation of server resources for future time periods, one or more algorithms are typically used for predicting future system loads. These predictions generally are based solely on historical data such as, for example, previous system loads, server operations, and the like. This conventional approach is suited for predicting regularly scheduled task executions.

SUMMARY

Embodiments of the present invention facilitate dynamically allocating server resources by using information about scheduled task executions, as well as historical information, to predict future system loads. In embodiments, aspects of embodiments of the invention may be combined with resource managers that add and remove servers. As the term is used herein, servers may refer to computing devices, software, firmware, virtual machines, and/or the like. Embodiments of the invention may facilitate more precise and efficient server resource allocation. For example, by implementing embodiments of the invention, a resource manager may be able to predict that 30 minutes from the time of predicting, there will be 12,000 new task executions scheduled, 50 minutes from the time of predicting, there will be 17,000 new task executions scheduled, 70 minutes from the time of predicting, there will be 8,000 new task executions scheduled, and the like. Using these estimates, the resource manager may predict how many servers should be allocated during those time periods to perform the executions such as, for example, by determining that 30 minutes from the time of predicting, the system should have 80 instantiated servers, 50 minutes from the time of predicting, the system should have 120 instantiated servers, 70 minutes from the time of predicting, the system should have 60 instantiated servers, and the like.

Embodiments of the invention include a computer-implemented method for dynamically allocating server resources, the method including determining a current queue distribution. The current queue distribution may include, for example, a number of times that one or more tasks, each having a task type from a set of task types, are scheduled to be executed within a time period in the future, where the current queue distribution is associated with the task types of the one or more tasks. Embodiments of the method further include referencing historical information associated with one or more prior executions of at least one task of each task type associated with the current queue distribution and predicting, based on the current queue distribution and the historical information, a total number of tasks of each task type associated with the current queue distribution that are to be executed during the time period in the future. In embodiments, the total number of tasks of each task type associated with the current queue distribution includes at least one task execution that is predicted to be scheduled before the time period begins. Embodiments of the method also include estimating an average maximum task consumption per server for each task type associated with the current queue distribution and determining a total number of servers to allocate during the time period.

Embodiments of the invention also include a scalable, distributed server system for performing tasks. Embodiments of the system include a plurality of worker servers, each configured to execute one or more tasks; and a management server configured to allocate server resources. In embodiments, the management server includes a processor that instantiates a plurality of software components stored in a memory. According to embodiments, the plurality of software components includes a task scheduler configured to schedule at least one execution of each of the one or more tasks; a task queue configured to store an indication of the at least one scheduled execution of the one or more tasks; and a resource manager. In embodiments, the resource manager is configured to (1) determine a current queue distribution, wherein the current queue distribution comprises a number of times that each of the one or more tasks, each having a task type from a set of task types, is scheduled to be executed within a time period that begins in the future, where the current queue distribution is associated with the task types of the one or more tasks; (2) reference historical information associated with one or more prior executions of at least one task of each of the task types associated with the current queue distribution; and (3) determine, based on the current queue distribution and the historical information, a number of servers to allocate during the time period.

Embodiments of the invention include another computer-implemented method for dynamically allocating server resources. The method may include determining a current queue distribution, where the current queue distribution includes a number of times that one or more tasks, each having a task type from a set of task types, are scheduled to be executed within a time period in the future, where the current queue distribution is associated with the task types of the one or more tasks. Embodiments of the illustrative method include referencing historical information associated with one or more prior executions of at least one task of each task type associated with the current queue distribution. The method may also include predicting, using a nonlinear estimator that takes, as input, the current queue distribution and the historical information, a total number of tasks of each task type associated with the current queue distribution that are to be executed during the time period in the future and estimating an average maximum consumption per server for each task type associated with the current queue distribution. Estimating the average maximum consumption per server may include optimizing a function configured to facilitate determining a maximum consumption that minimizes backlog. The illustrative method also includes determining a total number of servers to allocate during the time period.

Figure 1:
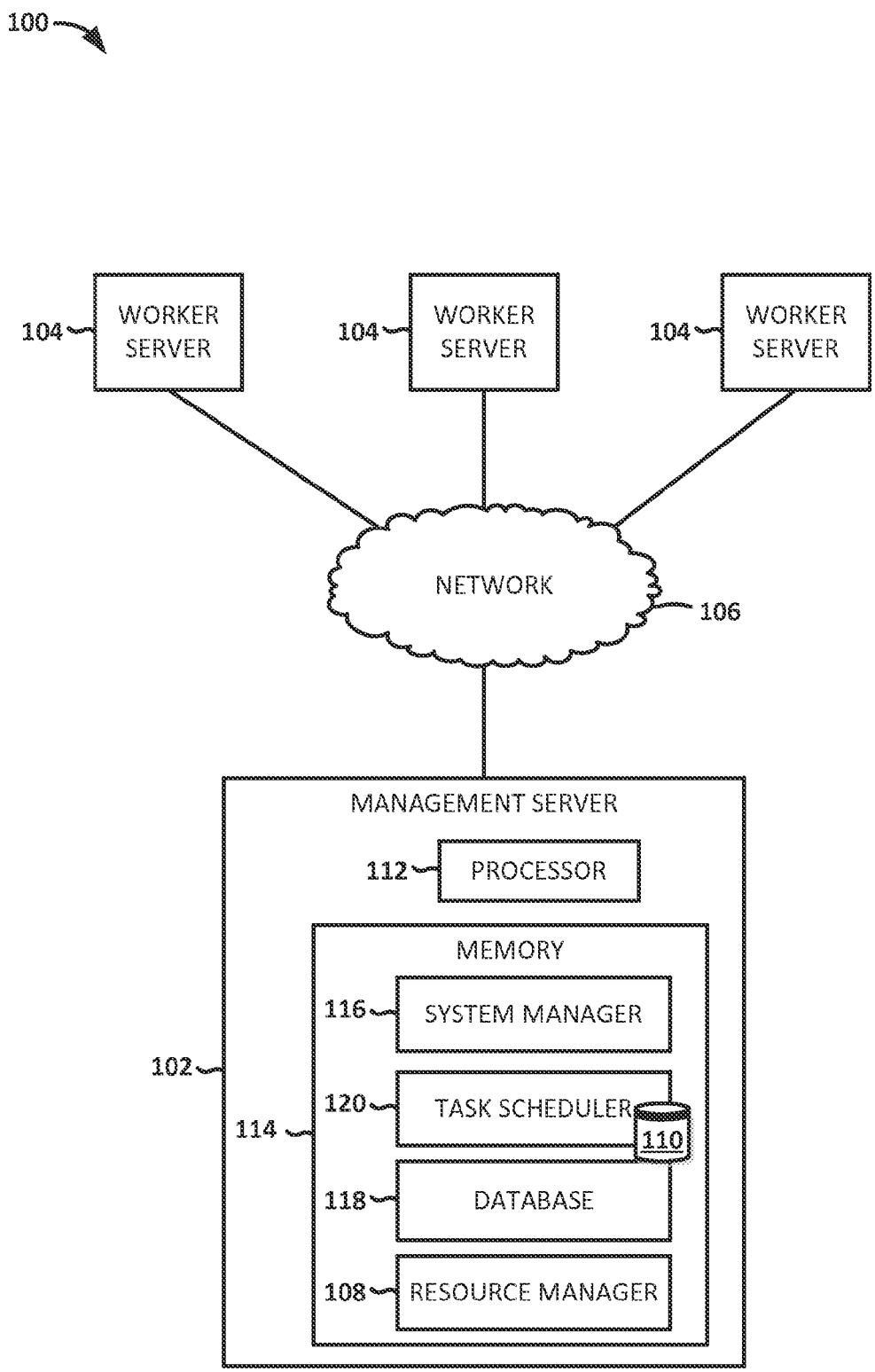
FIG. 1 is a block diagram illustrating an operating environment (and, in some embodiments, aspects of the present invention) in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

Embodiments of the present invention relate to dynamic allocation of server resources in systems that distribute scheduled executions of tasks across multiple servers. Embodiments of the invention facilitate allocation of server resources for task executions during a time period in the future by using information from a task execution queue combined with historical information to predict the load of the system during the time period (e.g., the estimated number of task executions expected to be performed during the time period). In embodiments, this predicted system load may be used to determine the server resources that should be allocated to handle that load during the time period. Aspects of embodiments of the invention may be implemented with any number of systems that distribute server-based task executions such as, for example, embodiments of the system described in U.S. application Ser. No. 14/132,968 to Jozef Habdank et al., entitled "SYSTEM AND METHOD FOR DYNAMICALLY SCHEDULING NETWORK SCANNING TASKS," filed Dec. 18, 2013, the entirety of which is hereby incorporated herein by reference.

FIG. 1 depicts an example of an operating environment 100 (and, in some embodiments, aspects of the present invention) in accordance with embodiments of the present invention. In embodiments, the operating environment 100 may be, include, or be included in, a scalable, distributed server system configured to perform server-based tasks. As shown in FIG. 1, the operating environment 100 includes a management server 102 that manages, adds, and/or removes worker servers 104, which are configured for executing tasks. In embodiments, the management server 102 is configured to allocate server resources (e.g., hardware resources, software resources, and/or a combination thereof). In embodiments, the management server 102 and/or the worker servers 104 may communicate via a network 106. The network 106 may be, or include, any number of different types of communication networks such as, for example, a bus network, a short messaging service (SMS), a local area network (LAN), a wireless LAN (WLAN), a wide area network (WAN), the Internet, a P2P network, custom-designed communication or messaging protocols, and/or the like. The network 106 may include a combination of multiple networks.

According to embodiments, the management server 102 implements a resource manager 108 that uses historical information and information about tasks that are currently scheduled for execution during a time period in the future to dynamically allocate server resources for executing tasks during the time period by predicting a total number of task executions to be performed during the time period. A time period in the future refers to a time period that occurs (e.g., begins) later in time than the time at, or around, which the system, or an aspect of the system, makes a determination, prediction, and/or the like, associated with the time period in the future. Similarly, "current" may refer to the time at, or around, which the system, or an aspect of the system, makes the determination, prediction, and/or the like.

The resource manager 108 may utilize information obtained about a current queue distribution associated with one or more task execution queues 110, as well as historical information associated with previous executions of tasks of certain task types, to facilitate dynamic allocation of server resources for executing the tasks during a future time period. The information may include a number of task executions scheduled for the time period, types of tasks scheduled, and/or the like. Dynamically allocating server resources may include adding and/or removing worker servers 104, assigning certain task executions to certain worker servers 104, and/or the like.

As shown in FIG. 1, the management server 102 may be implemented on a computing device that includes a processor 112 and a memory 114. Although the management server 102 is referred to herein in the singular, the management server 102 may be implemented in multiple server instances (e.g., as a server cluster), distributed across multiple computing devices, instantiated within multiple virtual machines, and/or the like. The resource manager 108 may be stored in the memory 114. In embodiments, the processor 112 executes the resource manager 108, which may facilitate dynamic server resource allocations for executions of a task or tasks.

Still referring to FIG. 1, the management server 102 includes a system manager 116 that manages operations of the worker servers 104. The worker servers 104 may be implemented using any number of different computing devices. For example, the management server 102 and the worker servers 104 may be included within a server cluster implemented using a single computing device, multiple computing devices, one or more virtual machines, and/or the like. In embodiments, the system manager 116 may be, include, be included in, and/or integrated with the resource manager 108, and may provide functions such as allocating resources (e.g., assigning particular scanning tasks and/or scanning task executions to particular worker servers 104, collecting and analyzing server performance feedback information, scaling the number of worker servers 104 available for tasks, and/or the like), facilitating user input (e.g., providing interfaces for creating scanning tasks, managing operations of various components of the service, and/or the like), and/or facilitating system maintenance.

In embodiments, each worker server 104 is configured to perform one or more executions of one or more tasks, where each of the tasks has a task type from a set of task types. In embodiments, the system manager 116 may assign task types to tasks based on any number of different categorization schemes and may store information associated with task type assignments, task executions and scheduling, portions of the information, and/or data extracted from the information in the memory 114 and may, for example, index the information using a database 118. The database 118 may be, or include, one or more tables, one or more relational databases, one or more multi-dimensional data cubes, one or more non-relational databases, and/or the like. Further, though illustrated as a single component implemented in the memory 114, the database 118 may, in fact, be a plurality of databases 118 such as, for instance, a database cluster, which may be implemented on a single computing device or distributed among a number of computing devices, memory components, or the like.

In operation, a task scheduler 120 schedules executions of tasks such as, for example, by placing an indication thereof in a time-based queue 110. The system manager 116 may be configured to determine which of the worker servers 104 will perform each task execution, thereby facilitating dynamic load-balancing. Additionally, the system manager 116 may be configured to add or remove servers to facilitate dynamic resource allocation. For example, the system manager 116 may be configured to open and/or close connections to server devices, remotely power-up and/or power-down server devices, instantiate and/or delete server instances, create and/or destroy virtual machines and/or the like.

According to embodiments, various components of the operating environment 100, illustrated in FIG. 1, may be implemented on one or more computing devices. A computing device may include any type of computing device suitable for implementing embodiments of the invention. Examples of computing devices include specialized computing devices or general-purpose computing devices such "workstations," "servers," "laptops," "desktops," "tablet computers," "handheld devices," and the like, all of which are contemplated within the scope of FIG. 1 with reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory 114 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to store information and can be accessed by a computing device such as, for example, quantum state memory, and the like. In embodiments, the memory 114 stores computer-executable instructions for causing the processor 112 to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the resource manager 108, the system manager 116, the database 118, and the task scheduler 120. Program components may be programmed using any number of different programming environments, including various languages, development kits, frameworks, and/or the like. Examples of such environments may include, for example, R, C#.Net, T-SQL, and/or the like. Some or all of the functionality contemplated herein may also be implemented in hardware and/or firmware.

The illustrative operating environment 100 shown in FIG. 1 is not intended to suggest any limitation as to the scope of use or functionality of embodiments of the present invention. Neither should the illustrative operating environment 100 be interpreted as having any dependency or requirement related to any single component or combination of components illustrated therein. Additionally, any one or more of the components depicted in FIG. 1 may be, in embodiments, integrated with various ones of the other components depicted therein (and/or components not illustrated), all of which are considered to be within the ambit of the present invention. For example, the resource manager 108 may be integrated with the system manager 116.

Figure 2:
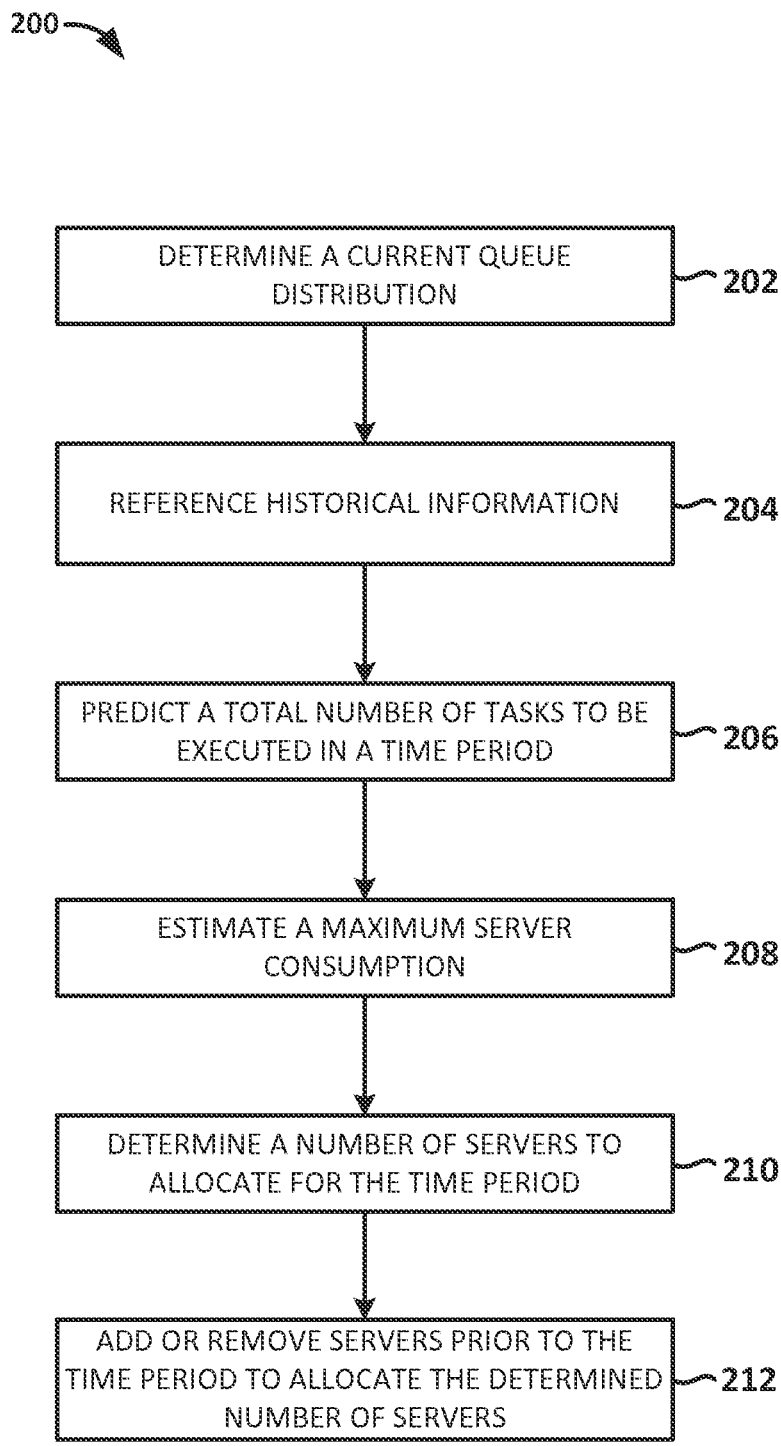
FIG. 2 is a flow diagram depicting an illustrative method of dynamically allocating server resources in accordance with embodiments of the present invention.

As described above, in embodiments, a resource manager (e.g., the resource manager 108 depicted in FIG. 1) may utilize information associated with task executions that are scheduled for a time period in the future to facilitate dynamically allocating server resources for performing executions of the task or tasks. FIG. 2 depicts an illustrative method 200 for dynamically allocating server resources by using, for example, a management server (e.g., the management server 102 depicted in FIG. 1), a resource manager (e.g., the resource manager 108 depicted in FIG. 1), a system manager (e.g., the system manager 116 depicted in FIG. 1), and/or one or more worker servers (e.g., the worker servers 104 depicted in FIG. 1). The management server may manage the functions performed by a number of worker servers to facilitate load-balancing with respect to large numbers of tasks. In embodiments, functions that could be performed by the worker servers may be performed by the management server, additionally or in lieu thereof. According to embodiments, tasks may be created by a user or users, an automated process or processes, and/or the like. A task may be provided, for example, to a task scheduler (e.g., the task scheduler 120 depicted in FIG. 1) and, upon receiving the task, the task scheduler may schedule the task for execution at an execution time by placing the task (or an indication of the task and/or the scheduled execution) in a task queue (e.g., the task queue 110 depicted in FIG. 1), which may be, for example, a unique time queue.

As shown in FIG. 2, embodiments of the illustrative method 200 include determining a current queue distribution (block 202). The current queue distribution refers to a distribution associated with scheduled task executions. For example, a current queue distribution may refer to a distribution of task types among a number of scheduled task executions. The current queue distribution may include a number of times that one or more tasks, each having a task type from a set of task types, is scheduled to be executed within a time period in the future. In embodiments, the time period may include, for example, a time that begins at least about 30 minutes in the future (i.e., about 30 minutes from the time that a particular prediction, determination, measurement, and/or the like is made) and may include any desired range of time (e.g., 30 seconds, 1 minute, 30 minutes, and/or the like). Additionally, according to embodiments, task types may include any number of different designations of types of tasks that may be performed by worker servers such as, for example, web crawling task types, cloud-based computational task types, network scanning task types, and/or the like.

Embodiments of the illustrative method 200 include referencing historical information associated with one or more prior executions of at least one task of each task type associated with the current queue distribution (block 204) and predicting a total number of tasks to be executed during a time period in the future (block 206). The total number of tasks to be executed during the time period in the future may be predicted based on the current queue distribution and the historical information, and include a prediction associated with task executions that are not scheduled at the time of the predicting but that are predicted to be scheduled before the time period begins and/or during the time period.

According to embodiments, predicting the total number of tasks to be executed during the time period may include providing inputs (e.g., a prior task creation rate, a prior prediction value, and/or the like) to a nonlinear estimator. In embodiments, the nonlinear estimator may be configured to transform one or more of the inputs based on one or more assumptions. The nonlinear estimator may be, or include, a nonlinear time series statistical model such as, for example, an autoregressive-moving-average with exogenous inputs estimator (ARMAX), a Hammerstein-Wiener estimator, and/or the like.

As shown in FIG. 2, the method 200 further includes estimating a maximum server consumption per server for each task type associated with the current queue distribution (block 208) and determining a number of servers to allocate for the time period (block 210). In embodiments, estimating an average maximum task consumption per server may include determining a current number of instantiated servers, determining an historical backlog, determining an historical task consumption rate, and providing the inputs to another nonlinear estimator. In embodiments, the nonlinear estimator may be configured to optimize a function that defines a relationship between backlog and consumption. In embodiments, maximum server consumption may be measured in other ways such as, for example, maximum task consumption per server for all task types, maximum task consumption per task type for all servers, and/or the like. As shown in FIG. 2, embodiments of the method 200 further include adding or removing servers prior to the time period so as to allocate the determined number of servers (block 212).

Figure 3:
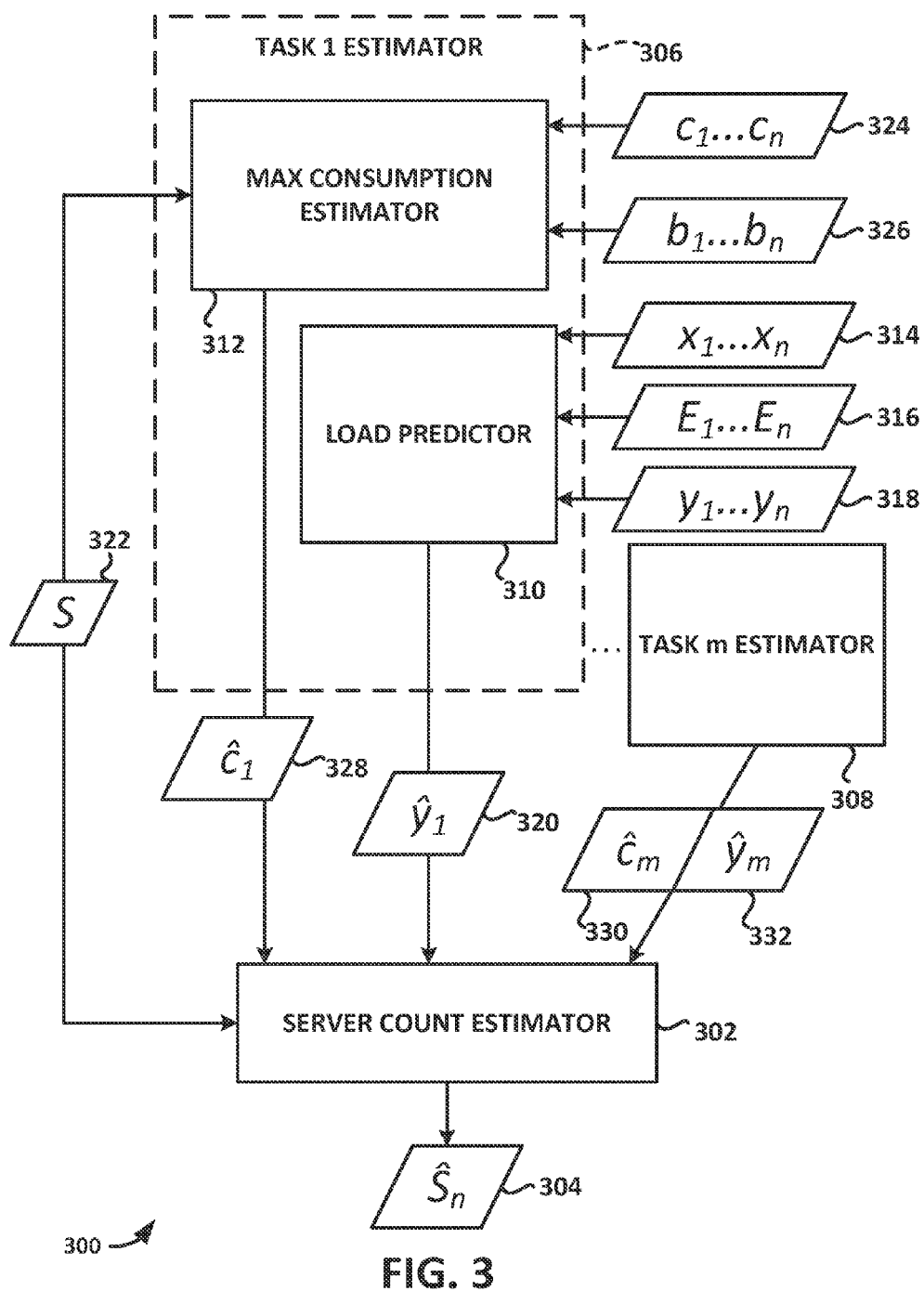
FIG. 3 is a schematic diagram depicting an illustrative method of determining a number of servers to allocate during a time period in accordance with embodiments of the present invention.

FIG. 3 is a schematic diagram depicting an illustrative process flow 300 for dynamically allocating server resources. The functions depicted in FIG. 3 and discussed below may represent computer algorithms implemented as computer-executable instructions and may be configured as program components, software modules, and/or the like. As shown in FIG. 3, embodiments of the illustrative process flow 300 include a server count estimator 302 that determines a number, $\hat{S}_n$ (304), of servers to be allocated during a particular time period. The server count estimator 302 determines the number, $\hat{S}_n$ (304), of servers based on a number of inputs, some of which may be generated using one or more task estimators 306, 308.

According to embodiments, any number of task estimators 306, 308 may be used. For example, in embodiments, a first task estimator 306 may be used to generate inputs associated with a first task and/or task type, a second task estimator (not shown) may be used to generate inputs associated with a second task and/or task type, and an mth task estimator 308 may be used to generate inputs associated with an mth task and/or task type. In embodiments, a separate task estimator 306, 308 may be used for each particular task, each task type, specified time periods, and/or the like. In FIG. 3 and the accompanying description, the example is described in the context of a number of task estimators, each configured to generate inputs associated with a unique task type. This example is used for purposes of clarity only, and embodiments of the process depicted in FIG. 3 may be implemented in the context of a single task estimator and/or task estimators configured to generate inputs associated with other categories of information, as described above. Additionally, although the task 1 estimator 306 is illustrated, and described in further detail below, it should be understood that any number of different aspects of the described detail may be similarly applicable to any number of additional task estimators such as, for example, the task m estimator 308.

As shown in FIG. 3, the task 1 estimator 306 includes a load predictor 310 and a maximum consumption estimator 312. The load predictor 310 may be configured to predict the total number of task executions of each task type to be performed during the time period. In embodiments, the load predictor 310 makes this prediction by determining at least one input that includes at least one of a prior task creation rate and a prior prediction value. In embodiments, the load predictor 310 may be, or include, a nonlinear estimator. The nonlinear estimator may take any number of different forms and be configured according to any number of different configurations. For example, the first nonlinear estimator may be configured to transform one or more inputs based on one or more assumptions such as, for example, an assumed downward bias that increases with time, an increasing variance, and/or the like. According to various embodiments, the load predictor 310 may be, or include, a nonlinear time series statistical model such as, for example, an autoregressive-moving-average with exogenous inputs estimator (ARMAX), a Hammerstein-Wiener estimator, and/or the like.

As shown in FIG. 3, the load predictor 310 takes, as input, one or more prior task creation rates, $x_1 \ldots x_n$ (314), associated with tasks of the first task type, a current number, $E_1 \ldots E_n$ (316), of task executions of the first task type scheduled in the queue (which may actually be several values, reflecting the number of tasks in the queue at each of several recent points in time), and one or more prior prediction values, $y1 \ldots y_n$ (318), of task executions. The prior task creation rate or rates, $x_1 \ldots x_n$ (314), may include, for example, a rate of task execution scheduling for one or more historical time periods, an average task execution scheduling rate, and/or the like. The current number, $E_1 \ldots E_n$ (316), of tasks of the first task type in the queue may be determined from a current queue distribution, which, as described above, may include a number of times that one or more tasks, each task having a task type from a set of task types, are scheduled to be executed within a time period in the future. Additionally, the prior prediction value or values, $y1 \ldots y_n$ (318), of task executions may include previously predicted values indicating predicted numbers of task executions to be scheduled (i.e., previous outputs from the load predictor 310).

As shown in FIG. 3, the load predictor 310 utilizes the inputs 314 and 316 to predict a total number, $\hat{y}_1$ (318), of tasks of the first task type that are to be executed during the time period. In embodiments, for example, the load predictor 310 may include a nonlinear estimator of the following form:

$$\hat{y}_n = f(x_n \ldots x_{n-p}, y_{n-1} \ldots y_{n-r}, E_{n+1} \ldots E_{n+s}); \text{ where}$$

$x_n \ldots x_{n-p}$ are prior rates of task execution scheduling;
$Y_{n-1} \ldots Y_{n-r}$ are prior and future values of prediction;
$E_{n+1} \ldots E_{n+s}$ are the partial future information about executions, or an execution distribution in a time queue; and
$\hat{y}_n$ is the estimated total number of task executions to be performed during the time period.

According to embodiments, the expression $E_{n+1} \ldots E_{n+s}$ may be nonlinearly transformed under the following assumptions: the expression has a downward bias, the downward bias is increasing with time, and the range of the values of $E_{n+1} \ldots E_{n+s}$ changes at every iteration.

As shown in FIG. 3, the maximum consumption estimator 312 utilizes inputs 322, 324, and 326 to estimate an average maximum task consumption per server, $\hat{c}_1$ (328), for the first task type. That is, the maximum consumption estimator 312 estimates a maximum number of tasks of the first task type that a server (e.g., a worker server 104 depicted in FIG. 1) can perform in a given time period. As shown in FIG. 3, the maximum consumption estimator 312 takes, as input, a current number, S (322), of instantiated servers. Additionally, the maximum consumption estimator 312 takes, as input, one or more values associated with historical consumption, $c_1 \ldots c_n$ (324), of tasks of the first task type, and one or more values associated with historical backlog, $b_1 \ldots b_n$ (326), of tasks of the first task type. The historical consumption, $c_1 \ldots c_n$ (324), may include, for example, a number of executions of tasks of the first task type performed during one or more historical time periods. In embodiments, the historical consumption, $c_1 \ldots c_n$ (324), may be determined for a single worker server, for a specified number of worker servers, and/or independently of the number of worker servers. The historical backlog, $b_1 \ldots b_n$ (326), may include, for example, a number of task executions that were scheduled for a prior time period that failed to execute on time as a result of insufficient server resources.

In embodiments, the maximum consumption estimator 312 may be, include, or otherwise utilize, a nonlinear estimator. The nonlinear estimator may be configured to optimize a function that defines a relationship between backlog and consumption. For example, the maximum consumption estimator 312 may be a nonlinear estimator that takes the following form:

$$\hat{c}_n = g(S_n, b_n \ldots b_{n-p}, c_n \ldots c_{n-r}); \text{ where}$$

$S_n$ is a current number of instantiated servers;
$b_n \ldots b_{n-p}$ is an historical backlog, defined as a number of scheduled executions that weren't performed due to insufficient server resources;
$c_n \ldots C_{n-r}$ is an historical average task consumption rate per server; and
$\hat{c}_n$ is an estimated maximum consumption rate per server.

According to embodiments, the estimator may be configured to optimize the following function:

$$g_e = \max\left(\frac{\hat{c}_n}{(1+b_n)^u}\right);$$

where u is a positive constant parameter.

The parameter, u, sets the curvature of the graph and may be selected, for example, to generate a slower or faster response, as desired. As can be seen from the illustrative function, the estimator may be configured to find a maximum consumption while maintaining backlog as close to zero as possible. In this manner, the resource manager may allocate as few resources as possible while minimizing backlog.

As described above, the server count estimator 302 takes, as input, the average maximum consumption per server, $\hat{c}_i$ (328), for the first task type, the predicted total number, $\hat{y}_1$ (320), of executions of tasks of the first task type, and any number of other similar values, $\hat{c}_m$ (330) and $\hat{y}_m$ (332), as generated by additional task estimators 308. Additionally, as shown in FIG. 3, the server count estimator 302 may take, as input, the current number, S (322), of instantiated servers. According to embodiments of the example described above, the server count estimator may, for example, be a function of the following form:

$$\hat{S}_n = \max\left\{\left\lceil \frac{y_{1,n}}{S_{1,n}\hat{c}_{1,n}} \right\rceil, \left\lceil \frac{y_{2,n}}{S_{2,n}\hat{c}_{2,n}} \right\rceil, \ldots, \left\lceil \frac{y_{m,n}}{S_{m,n}\hat{c}_{m,n}} \right\rceil\right\};$$

where
$\hat{S}_n$ is a predicted number of servers required to be allocated for the particular time period and the operation designated by the brackets provides the closest integer higher than the number in the brackets; and m is a number of task types.

According to embodiments, the function is configured to find the maximum number of required servers in the set of outputs coming from all task estimators.

The illustrative process 300 shown in FIG. 3 is not intended to suggest any limitation as to the scope of use or functionality of embodiments of the present invention. Neither should the illustrative process 300 be interpreted as having any dependency or requirement related to any single component or combination of components illustrated therein. Additionally, any one or more of the components depicted in FIG. 3 may be, in embodiments, integrated with various ones of the other components depicted therein (and/or components not illustrated), all of which are considered to be within the ambit of the present invention. For example, the load predictor 310 and the maximum consumption estimator 312 may be integrated as a single component.

Figure 4:
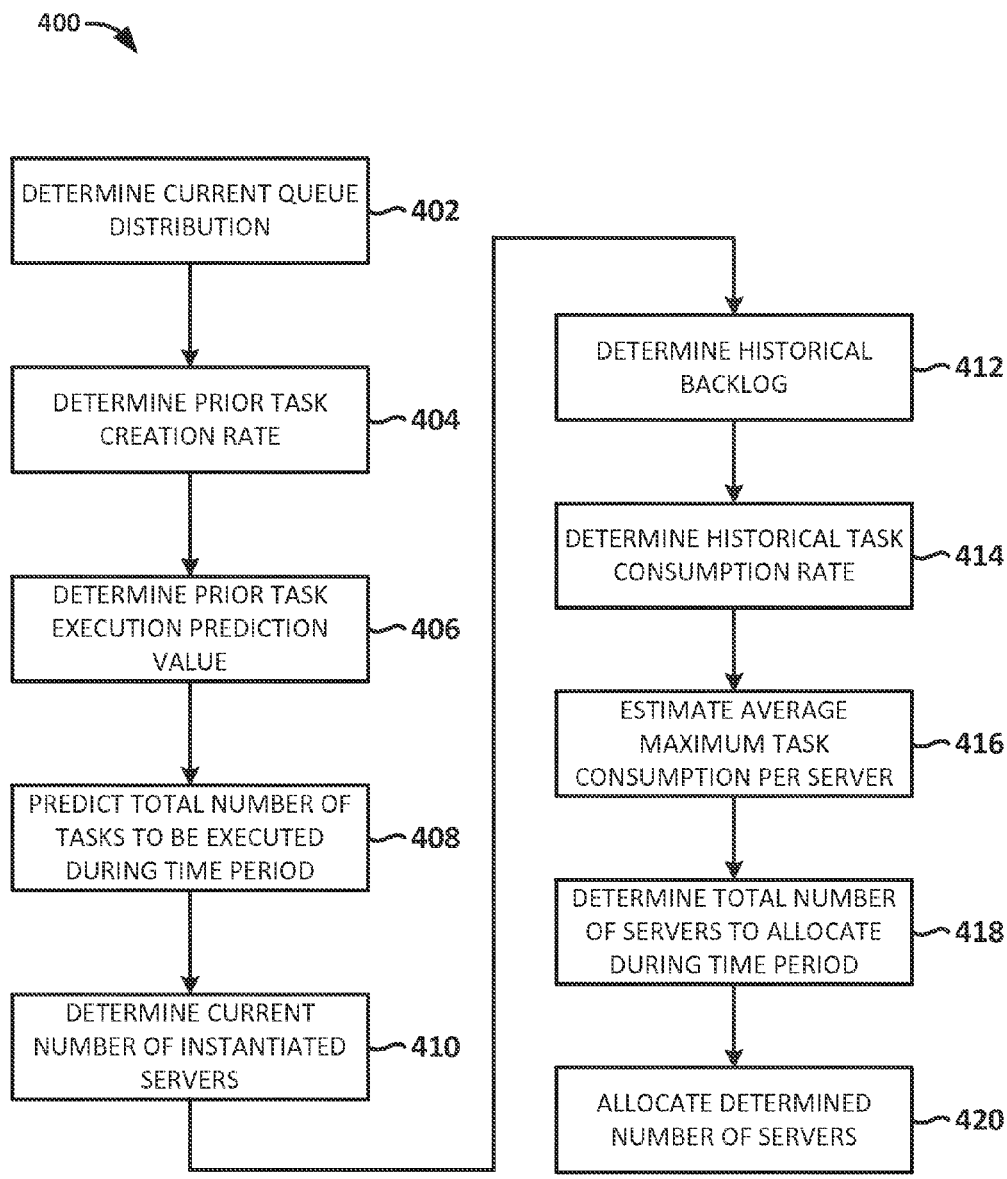
FIG. 4 is a flow diagram depicting another illustrative method of dynamically allocating server resources in accordance with embodiments of the present invention.

Additional, alternative and overlapping aspects of embodiments of the invention for dynamically allocating server resources for performing tasks are illustrated in FIG. 4. As described above, a resource manager (e.g., the resource manager 108 depicted in FIG. 1) may utilize a current queue distribution, in addition to historical task execution information, to dynamically add or remove worker servers so as to allocate a determined number of servers for a particular time period in the future. FIG. 4 is a flow diagram depicting an illustrative method 400 of dynamically allocating server resources.

As depicted in FIG. 4, embodiments of the illustrative method 400 include determining a current queue distribution (block 402), determining a prior task creation rate (block 404), and determining a prior task execution prediction value (block 406). As described above, the current queue distribution may include a number of times one or more tasks, each having a task type of a set of task types, are scheduled to be executed within a time period in the future, where the current queue distribution is associated with the task types of the one or more tasks. Embodiments of the method 400 include predicting (e.g., using a load predictor such as, for example, the load predictor 310 shown in FIG. 3) a total number of tasks of each of the task types associated with the current queue distribution, to be executed during the time period (block 408). In embodiments, the total number of tasks to be executed during the time period may be predicted using a nonlinear estimator.

As shown in FIG. 4, the resource manager may determine a current number of instantiated servers (block 410). Additionally, embodiments of the illustrative method 400 include determining an historical backlog (block 412) and an historical task consumption rate (block 414). As described above, the historical backlog may include a number of task executions that were scheduled for a prior time period that failed to be performed on time as a result of insufficient server resources. The historical task consumption rate may include a number of task executions performed during a prior time period. Based on this information, the resource manager estimates an average maximum task consumption per server (block 416) and determines a total number of servers to allocate during the time period (block 418). In embodiments, the method 400 further includes allocating a determined number of servers (block 420) such as by adding or removing servers prior to the time period.

While embodiments of the present invention are described with specificity, the description itself is not intended to limit the scope of this patent. Thus, the inventors have contemplated that the claimed invention might also be embodied in other ways, to include different steps or features, or combinations of steps or features similar to the ones described in this document, in conjunction with other technologies. For example, embodiments of the invention may be implemented in connection with anti-piracy network canning tasks, web crawling tasks, private and public cloud computing tasks, and/or the like.

The following is claimed:

1. A computer-implemented method for dynamically allocating server resources, the method comprising:
    determining a current queue distribution, wherein the current queue distribution comprises a number of times that one or more tasks, each having a task type from a set of task types, are scheduled to be executed within a time period in the future,
    wherein the current queue distribution is associated with the task types of the one or more tasks;
    referencing historical information associated with one or more prior executions of at least one task of each task type associated with the current queue distribution;
    predicting, based on the current queue distribution and the historical information, a total number of tasks of each task type associated with the current queue distribution that are to be executed during the time period in the future, wherein the total number of tasks of each task type associated with the current queue distribution comprises at least one task execution that is predicted to be scheduled before the time period begins;
    estimating an average maximum task consumption per server for each task type associated with the current queue distribution; and
    determining a total number of servers to allocate during the time period to execute tasks within the time period;
    comprising adding or removing one or more servers prior to the beginning of the time period so as to allocate the determined total number of servers during the time period.

2. The method of claim 1, wherein predicting the total number of tasks of each task type associated with the current queue distribution that are to be executed during the time period comprises:
    determining at least one input comprising at least one of a prior task creation rate and a prior prediction value; and
    providing the at least one input to a nonlinear estimator.

3. The method of claim 2, wherein the nonlinear estimator is configured to transform the at least one input based on at least one assumption, wherein the at least one assumption comprises at least one of a downward bias that increases with time and an increasing variance.

4. The method of claim 3, wherein the nonlinear estimator comprises a nonlinear time series statistical model.

5. The method of claim 1, wherein estimating the average maximum task consumption per server for each task type associated with the current queue distribution comprises:
    determining a current number of instantiated servers;
    determining an historical backlog, wherein the historical backlog comprises a number of tasks that were scheduled for a prior time period that failed to execute on time as a result of insufficient server resources;
    determining an historical task consumption rate; and
    providing the determined current number of instantiated servers, the determined historical backlog, and the determined historical task consumption rate to a nonlinear estimator.

6. The method of claim 5, wherein the nonlinear estimator is configured to optimize a function that defines a relationship between backlog and consumption.

7. The method of claim 1, wherein the time period to execute tasks begins at least about 30 minutes in the future.

8. The method of claim 1, wherein the set of task types comprises at least one of a web crawling task type, a cloud-based computational task type, and a network scanning task type.

9. A scalable, distributed server system for performing tasks, the server system comprising:
    a plurality of worker servers, wherein each of the plurality of worker servers is configured to execute one or more tasks; and
    a management server configured to allocate server resources, the management server comprising a processor that instantiates a plurality of software components stored in a memory, the plurality of software components comprising:
        a task scheduler configured to schedule at least one execution of each of the one or more tasks;
        a task queue configured to store an indication of the at least one scheduled execution of each of the one or more tasks; and
        a resource manager configured to
        (1) determine a current queue distribution, wherein the current queue distribution comprises a number of times that each of the one or more tasks, each having a task type from a set of task types, is scheduled to be executed within a time period that begins in the future,
        wherein the current queue distribution is associated with the task types of the one or more tasks;
        (2) reference historical information associated with one or more prior executions of at least one task of each of the task types associated with the current queue distribution; and
        (3) determine, based on the current queue distribution and the historical information, a number of servers to allocate during the time period to execute tasks within the time period;
        comprising adding or removing one or more servers prior to the beginning of the time period so as to allocate the determined total number of servers during the time period.

10. The system of claim 9, wherein the resource manager is further configured to:
    predict, based on the current queue distribution and the historical information, a total number of tasks of each of the task types associated with the current queue distribution that are to be executed during the time period, wherein the total number of tasks of each of the task types associated with the current queue distribution comprises at least one task execution predicted to be scheduled before the time period begins; and
    estimate an average maximum task consumption per server for each of the task types associated with the current queue distribution.

11. The system of claim 10, wherein the resource manager is configured to predict the total number of tasks of each of the task types associated with the current queue distribution that are to be executed during the time period by determining at least one input comprising at least one of a prior task creation rate and a prior prediction value; and providing the at least one input to a nonlinear estimator.

12. The system of claim 11, wherein the nonlinear estimator is configured to transform the at least one input based on at least one assumption, wherein the at least one assumption comprises at least one of a downward bias that increases with time and an increasing variance.

13. The system of claim 12, wherein the nonlinear estimator comprises a nonlinear time series statistical model.

14. The system of claim 10, wherein the resource manager is configured to estimate the average maximum consumption per server for each of the task types associated with the current queue distribution by utilizing a nonlinear estimator that takes, as input, at least one of a current number of instantiated servers, an historical task consumption rate, and an historical backlog, wherein the historical backlog comprises a number of tasks that were scheduled for a prior time period that failed to execute on time as a result of insufficient server resources.

15. The system of claim 14, wherein the nonlinear estimator is configured to optimize a function that defines a relationship between backlog and consumption.

16. The system of claim 9, wherein the time period to execute tasks begins at least about 30 minutes in the future.

17. The system of claim 9, wherein the set of task types comprises at least one of a web crawling task type, a cloud-based computational task type, and a network scanning task type.

18. A computer-implemented method for dynamically allocating server resources, the method comprising:
   determining a current queue distribution, wherein the current queue distribution comprises
   a number of times that one or more tasks, each having a task type from a set of task types, are scheduled to be executed within a time period in the future,
   wherein the current queue distribution is associated with the task types of the one or more tasks;

referencing historical information associated with task creation corresponding to each task type associated with the current queue distribution, wherein the historical information comprises at least one prior rate of task creation;

predicting, using a nonlinear estimator that takes, as input, the current queue distribution and the historical information, a total number of tasks of each task type associated with the current queue distribution that are to be executed during the time period in the future;

estimating an average maximum consumption per server for each task type associated with the current queue distribution, wherein estimating the average maximum consumption per server comprise optimizing a function configured to facilitate determining a maximum consumption that minimizes backlog; and determining a total number of servers to allocate during the time period to execute tasks within the time period;

comprising adding or removing one or more servers prior to the beginning of the time period so as to allocate the determined total number of servers during the time period.

19. The method of claim 18, wherein the function is defined by a maximum of a ratio of a maximum estimated consumption rate per server to an historical backlog term.

* * * * *